United States Patent [19]
Tokizaki et al.

[11] Patent Number: 5,375,429
[45] Date of Patent: Dec. 27, 1994

[54] METHOD AND APPARATUS FOR CONTROLLING AN AIR CONDITIONER WITH A SOLOR CELL

[75] Inventors: Hisashi Tokizaki, Ora; Keigo Onizuka, Oizumi; Shigeharu Sasaki, Ota; Kenichi Koga; Yoshihiro Nakamura, both of Oizumi; Kazuo Ogura, Oura, all of Japan

[73] Assignee: Sanyo Electric Co., Ltd., Osaka, Japan

[21] Appl. No.: 60,218

[22] Filed: May 13, 1993

[30] Foreign Application Priority Data

Jun. 26, 1992 [JP] Japan ................. 4-169196
Oct. 22, 1993 [JP] Japan ................. 4-284404

[51] Int. Cl.$^5$ ............................................. F25B 27/00
[52] U.S. Cl. ................................ 62/235.1; 62/236; 62/230; 323/906
[58] Field of Search .................... 62/235.1, 236, 175, 62/230; 323/906; 307/21, 22, 20, 24, 25, 26, 33, 34, 35, 38, 62

[56] References Cited

U.S. PATENT DOCUMENTS

| | | | |
|---|---|---|---|
| 4,367,633 | 1/1983 | Strathman | 62/235.1 X |
| 4,494,180 | 1/1985 | Streater et al. | 323/906 X |
| 4,495,450 | 1/1985 | Tokizaki et al. | 318/138 |
| 4,697,136 | 9/1987 | Ishikawa | 323/906 X |
| 4,698,744 | 10/1987 | Itani et al. | 364/140 |
| 4,750,102 | 6/1988 | Yamano et al. | 323/906 X |
| 4,916,382 | 4/1990 | Kent | 323/906 X |

FOREIGN PATENT DOCUMENTS

61-4174  2/1986  Japan .

Primary Examiner—Harry B. Tanner
Attorney, Agent, or Firm—Wenderoth, Lind & Ponack

[57] ABSTRACT

A DC power supply bus is used to connect a solar cell to an outdoor unit of air conditioners. The output voltage of each outdoor unit is controlled so as to maximize the power generation efficiency of the solar cell and the DC power supplied to the air conditioner is regulated to a predetermined value.

5 Claims, 17 Drawing Sheets

METHOD AND APPARATUS FOR CONTROLLING AN AIR CONDITIONER WITH A SOLAR CELL

BACKGROUND OF THE INVENTION

The present invention relates in general to an air conditioner employing electric power by a solar cell/solar cells as an operation power and more particularly to a method and apparatus for controlling the air conditioner.

A conventional air conditioner using solar cells is disclosed in Japanese Utility Model Publication No. 61-4174/1986. The air conditioner employs the output power of the solar cells as a power supply when the weather is fine and the output power is large, and the air conditioner employs AC power supplied from a commercial AC power supply when the weather is "rainy" or "cloudy" and the output power of the solar cell is small.

The solar cells have not satisfactorily been utilized for the conventional air conditioners since they are not designed for use when output thereof is lower than a predetermined value. The running electric power necessary for the air conditioner may be secured by increasing the area or size of the solar cell assembly when its output is small when it is in rainy or cloudy. The problem, however, is that excessive power may be generated by the increased area of the solar cell when the weather is fine.

Moreover, the optimum operating point of the solar cell which varies with the solar radiation amount is not followed up and the generating efficiency of the solar cell may be deteriorated unless the optimum operating point thereof is followed.

When the air conditioning operation is not needed or when no user is present in an air conditioned room, the solar cell is not utilized, and this has made the utilization factor of the solar cell inferior.

SUMMARY OF THE INVENTION

An object of the present invention is to provide an improvement in the control operation of an air conditioner so that a solar cell/solar cells can be utilized effectively.

Another object of the present invention is to provide an improvement which can control the DC power supplied from a solar cell/solar cells from exceeding a predetermined value.

A further object of the present invention is to provide an improvement which can control the DC power supplied from the DC power supply bus to the air conditioner so that a withstand power of the air conditioner to the solar cell can be designed to be at a predetermined power.

Another object of the present invention is provide an improvement of the air conditioner which can reduce the size and cost thereof.

The present invention provides a method controlling an air conditioner using a DC power obtained by recitifying an AC power in combination with the DC power supplied from at least a single solar cell, comprising the steps of:

connecting a plurality of conditioners each supplied with AC power from an AC power supply to said solar cell by means of a DC power supply bus, and controlling the DC power supplied from the DC power supply bus to the air conditioner thereby controlling the DC power to a predetermined value.

A converter can be used to vary the voltage of the DC power supplied from the solar cell to the air conditioner, so that the value of the DC power can be maximized.

The supply of the DC power from the solar cell can be stopped when the voltage of the DC power from the solar cell is lower than a predetermined voltage.

Further, the present invention provide an apparatus for controlling an air conditioner employing DC power generator by a solar cell as operating power, comprising a DC power supply bus of a single system connected to said solar cell, a rectifier device for rectifying the AC power from the AC power source to thereby provide a DC power, means for preventing the DC power supplied from said solar cell from exceeding a predetermined value, wherein said means has a DC/DC converter for varying the voltage of DC power supplied from said solar cell to the air conditioner to thereby maximize a value of said DC power.

In the apparatus, the solar cell is divided into a plurality of solar cell panels, each being connected to the DC power supply.

As it has been arranged that the DC power generated by the solar cell is supplied via the common power supply bus to a plurality of air conditioners by the method of controlling air conditioners, the power generated by the solar cell is distributed for use when the number of air conditioners in operation is large and the power generated by the solar cell is consumed by the air conditioners in operation when the number of air conditioners in operation is small. Therefore, the power generated by the solar cell is utilized at all times.

When the converter is used to boost the voltage of the DC power generated by the solar cell, the voltage is regulated so that the DC power is maximized. Consequently, the solar cell is allowed to generate power at an operating point at which maximum efficiency is obtained at all times.

Since there is provided a mode in which only the DC power generated by the solar cell is employed for driving purposes, preliminary air conditioning prior to air conditioning a room can be carried out without using commercial AC power.

Since the solar cell is divided into the plurality of solar cell panels, the freedom of installing them is increased.

PREFERRED EMBODIMENTS OF THE INVENTION

Figure 1:
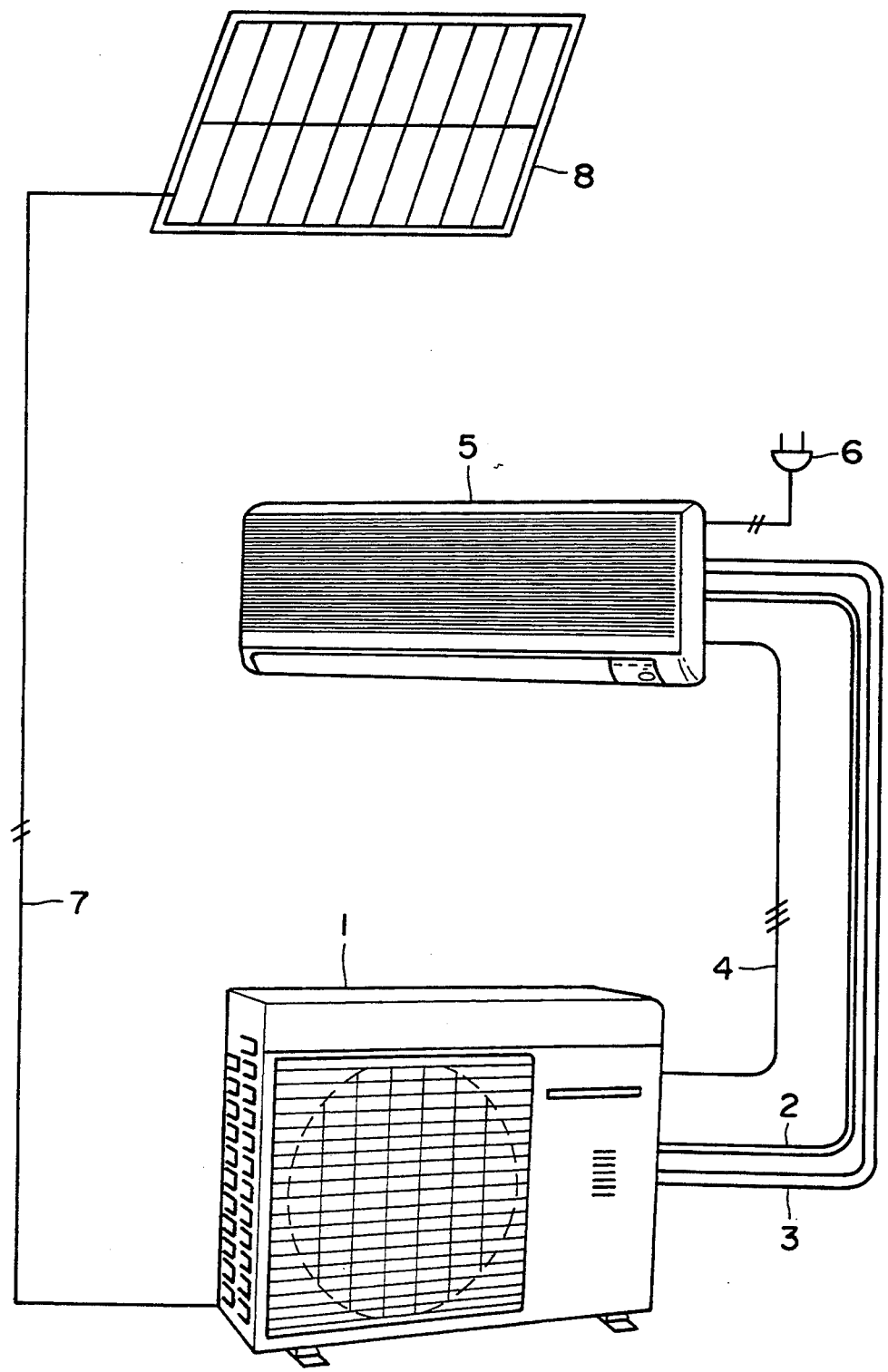
FIG. 1 is a schematic diagram of an air conditioner having a room unit and an outdoor unit embodying the present invention.

In FIG. 1, an outdoor unit 1 is connected to a room unit 5 via refrigerant pipes 2, 3 forming a refrigeration cycle and signal/power lines 4. Further, a power supply plug 6 supplies Ac power from a commercial Ac power supply to the room unit 5, and DC power lines 7 supplies the DC power generated by a solar cell 8 to the outdoor unit 1.

In this case, the room unit 5 receives a wireless control signal from a remote controller (not shown) so as to operate the air conditioner.

Figure 2:
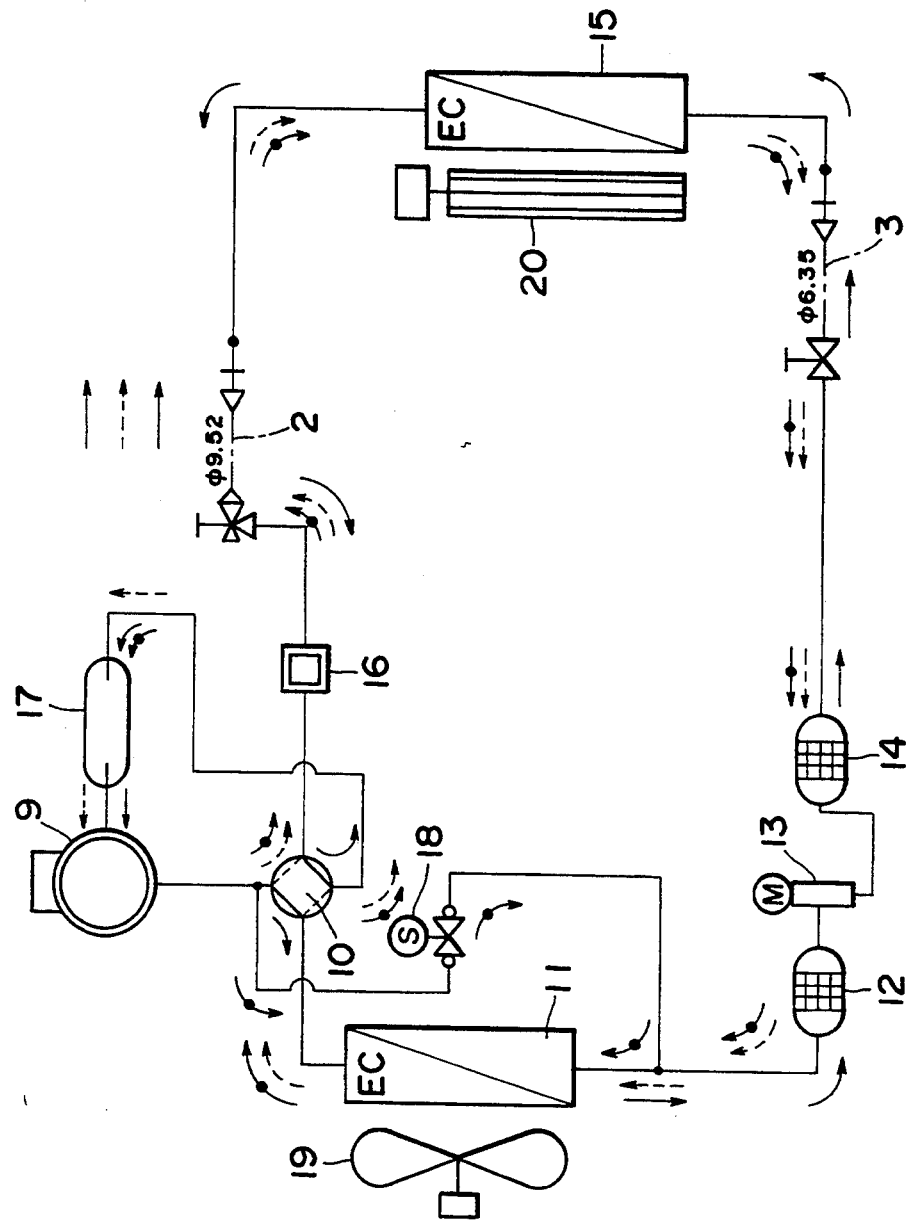
FIG. 2 is a diagram illustrating a refrigeration cycle of the air conditioner.

In FIG. 2, a refrigerant compressor 9, a four-way selector valve 10, an outdoor heat exchanger 11, strainers 12, 14, an expansion device 13, for example, an electric expansion valve, an indoor heat exchanger 15, a silencer 16, and an accumulator 17 in the form of an annular refrigerant pipe to form a refrigeration cycle.

Further, a solenoid switch valve 18 forms a refrigerant bypass circuit when it opens. A blower 19 is used for sending air to the outdoor heat exchanger 11 with a propeller fan, and a blower 20 is used for sending air to the room heat exchanger 15 with a cross-flow fan.

The high-temperature high-pressure refrigerant discharged from the compressor 9 flows in the direction of a solid arrow line (FIG. 2) during the cooling operation and the outdoor heat exchanger 11 serves as a condenser, whereas the room heat exchanger 15 serves as an evaporator. The room heat exchanger 15 is thus used to cool a room to be air conditioned.

The high-temperature high-pressure refrigerant discharged from the compressor 9 flows in the direction of a dotted arrowline during the heating operation and the room heat exchanger 15 serves as a condenser, whereas the output heat exchanger 11 serves as an evaporator. The room heat exchanger 15 is thus used to heat a room to be air conditioned.

As the solenoid valve 18 opens at the time of the defrosting operation while the refrigerant flows during the heating operation, the refrigerant flows as shown by a solid line with dots. In other words, part of the high-temperature high-pressure refrigerant discharged from the compressor 9 is caused to circulate into the outdoor heat exchanger 11 serving as the evaporator so as to raise the temperature of the outdoor heat exchanger 11, so that the operation of defrosting the outdoor heat exchanger 11 is performed.

Figure 3:
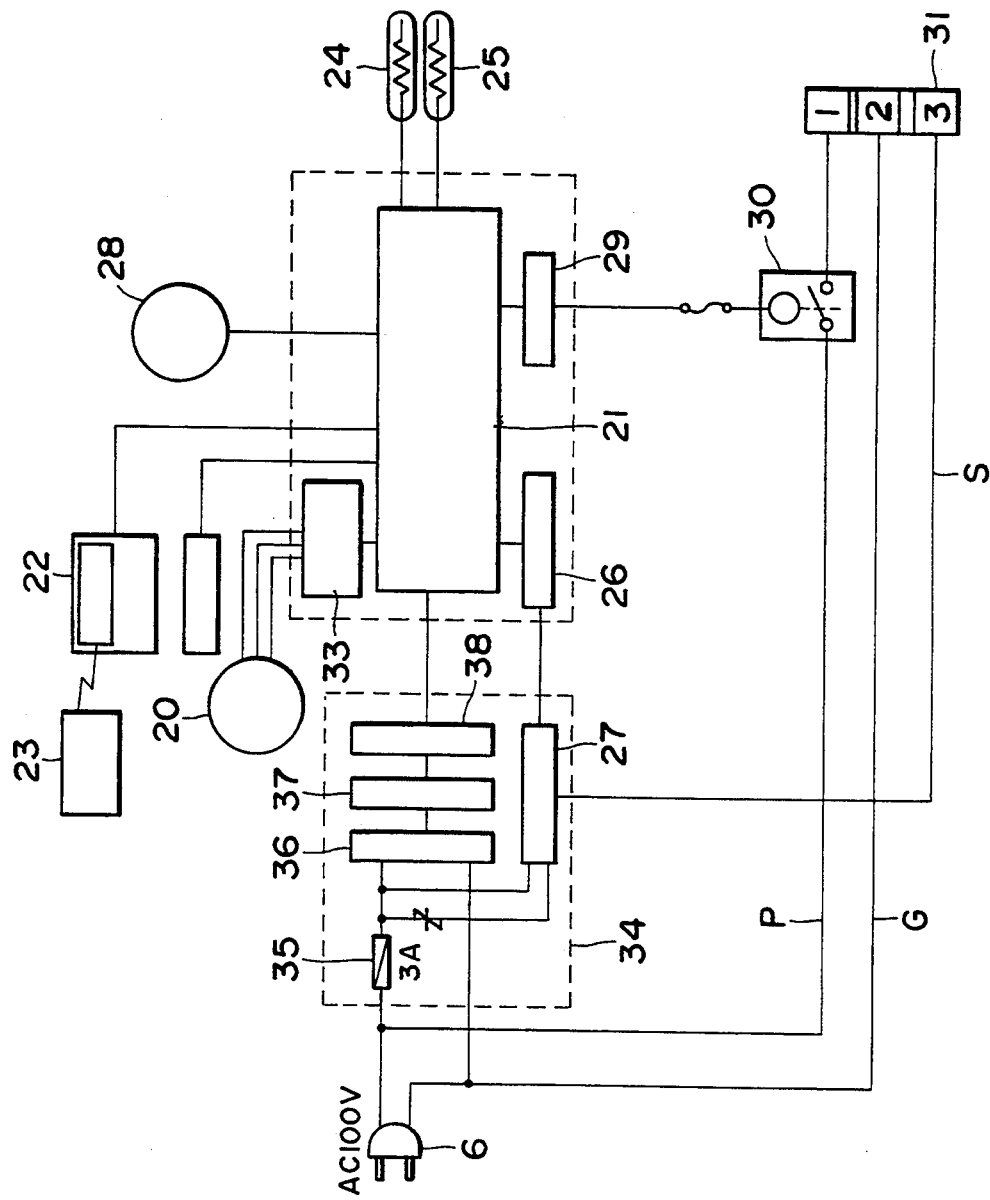
FIG. 3 is a block diagram illustrating a principal part of an electric circuit of a room unit.

In FIG. 3, a microprocessor 21 (a microcomputer 87C196MC of Intel stored with a program) operates on the basis of the program stored in its internal ROM in order to control the air conditioner. On receiving the control signal and the room temperature value delivered from a remote controller 23 via a signal receiving unit, the suction air temperature of the room heat exchanger 15 detected by a room temperature sensor 24 and the temperature of the room heat exchanger 15 detected by a heat-exchange temperature sensor 25, the microprocessor 21 controls the amount of air (r.p.m of a fan motor) sent by the blower 20 and a rotational angle of a flap motor 28, that is, an discharge angle of air discharged from the indoor unit 5. In addition, the microprocessor 21 computes the refrigeration capacity required for the room to be air conditioned and outputs to a signal line 4 a signal for indicating the refrigeration capacity via serial circuits 26, 27 which are circuits for modulating the signal expressed by H/L voltage with a predetermined Baud rate and those for demodulating the signal of the same kind transmitted from the outdoor unit.

The signal line 4 includes an exclusive power line P, an exclusive signal line S and a power-signal common line G. In this case, the serial circuit 27 is used connect one signal line to the common line G.

A power relay 30 has a contact and the switching the contact is controlled by the output of the microcomputer 21 via a driver 29. When the contact closes the circuit, the AC power obtained through the plug 6 is supplied to terminals 31. A motor drive circuit has six power switching elements which are connected in the form of a three-phase bridge. Each of the switching elements is turned on/off according to the signal from the microcomputer 21 so, as to control the rotation of a DC fan motor. With respect to the signal output from the microcomputer, a rotational angle of a rotor is computed from the variation of the inductive voltage generated in the non-energized stator winding of the DC fan motor to obtain the signal output based on the angle of rotation. (See U.S. Pat. No. 4,495,450)

A power supply board 34 has a current fuse 35, a rectifier circuit 36, a power supply circuit 37 for driving the DC fan motor and a power supply control circuit for the microcomputer 21.

Figure 4:
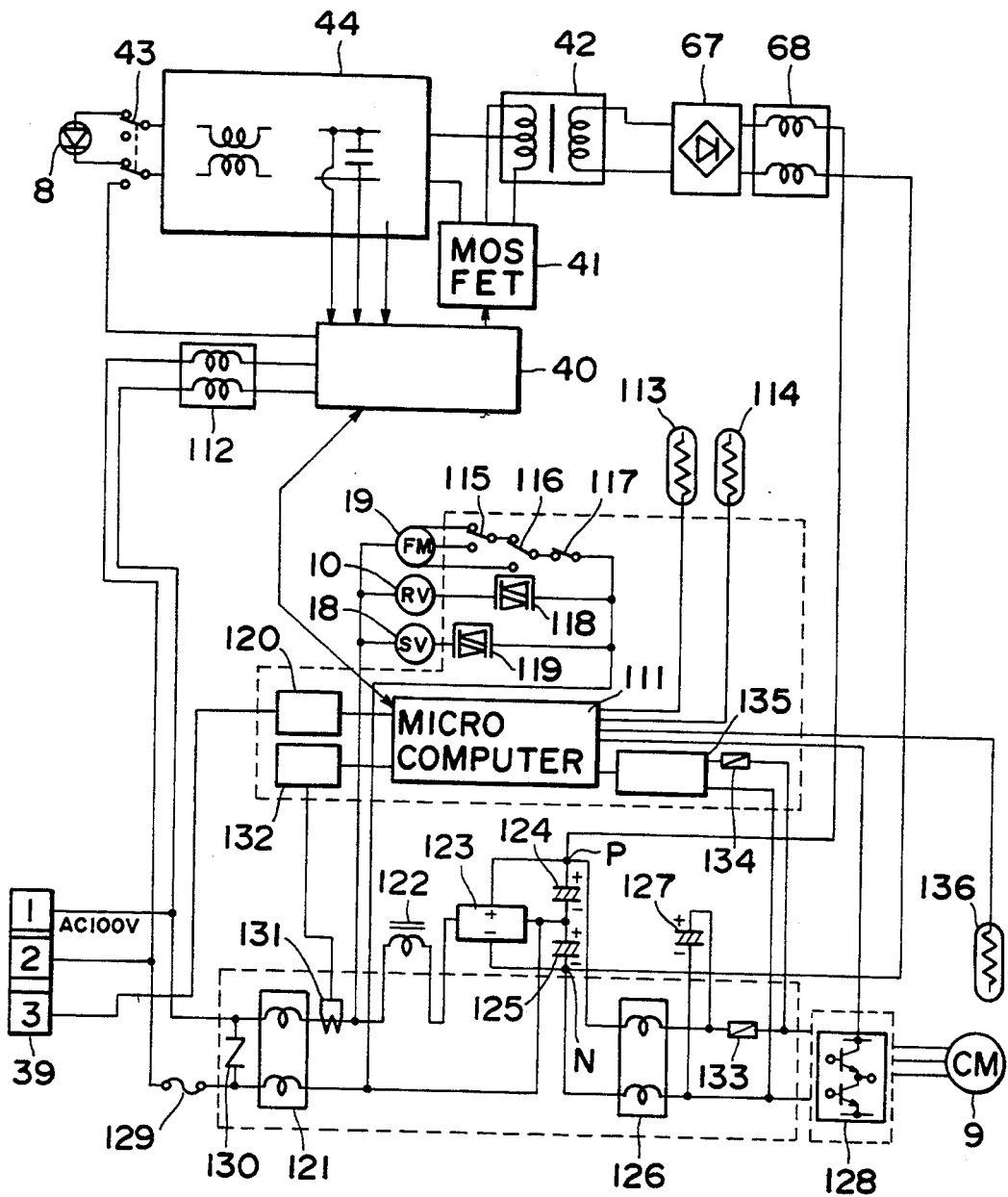
FIG. 4 is a diagram illustrating a principal part of an electric circuit of an outdoor unit.

In FIG. 4 illustrating the principal part of an electric circuit in the outdoor unit 1 of FIG. 1, terminals 39 are connected via signal lines to the terminals 31 of FIG. 3 in such a way as to conform to the respective terminal numbers of the latter.

A control circuit 40 is provided for a DC/DC converter. After the voltage of the DC power generated by the solar cell 8 is boosted by means of a switching element (MOSFET) 41 and a boosting transformer 42, the DC power is supplied to the DC section of an inverter.

A changeover switch 40 has two interlocking contacts. The changeover switch 43 is operated to select between a case where the solar cell 8 is connected to a filter circuit 44 and a case where the solar cell 8 is opened.

Figure 5:
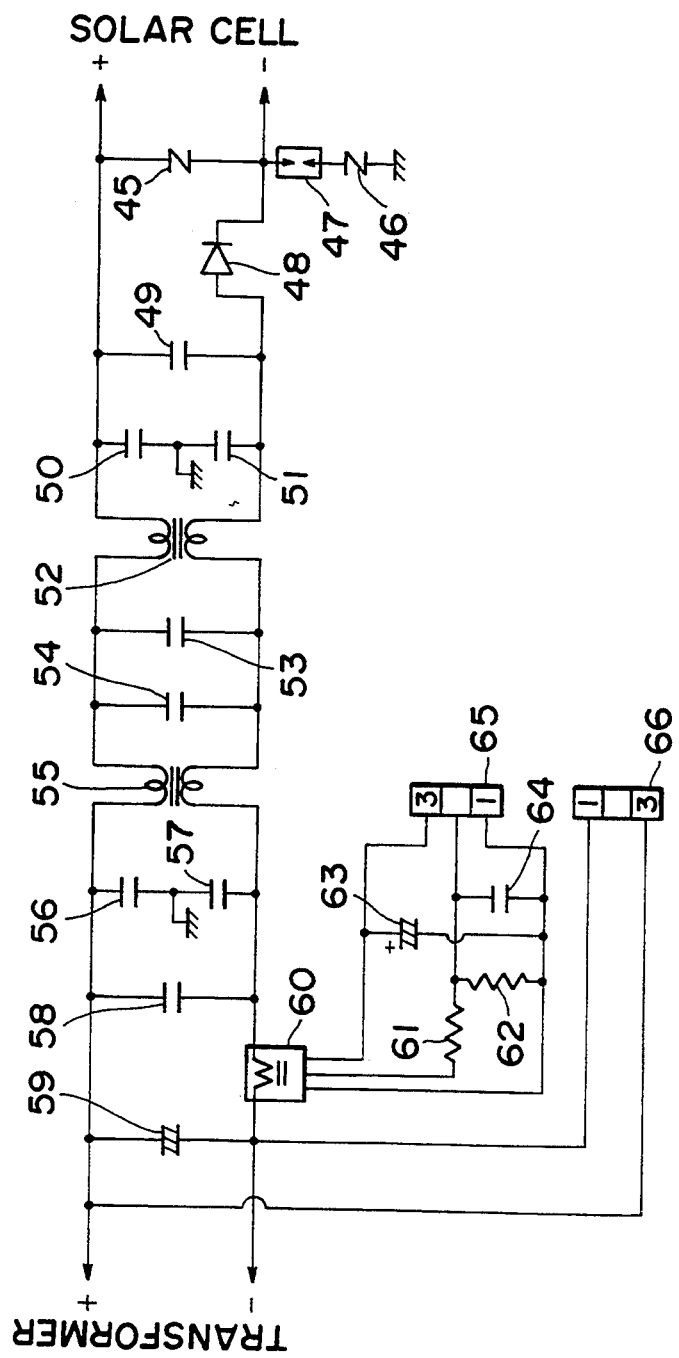
FIG. 5 is an electric circuit diagram of a filter circuit connected to a solar cell.

In FIG. 5 illustrating the filter circuit 44, varistors 45, 46, an arrester 47, and a diode 48 are provided for preventing the backflow of power to the solar cell 8. Capacitors 49 to 51, 53, 54, 56 to 58 as noise absorbers, choke coils 52, 55 forming a noise filter, a smoothing electrolytic capacitor 59, a DC current detector 60 for detecting DC current (using a Hall device) without a shunt resistor are provided. The DC current thus detected is delivered from terminals 65 to the control circuit 40. Further, resistors 61, 62, a capacitor 63 for the power supply of the current detector 60, and a capacitor 64 as a noise absorber are provided.

Reference numeral 66 denotes terminals for delivering the terminal voltage of the capacitor 59 to the control circuit 40.

Figure 6:
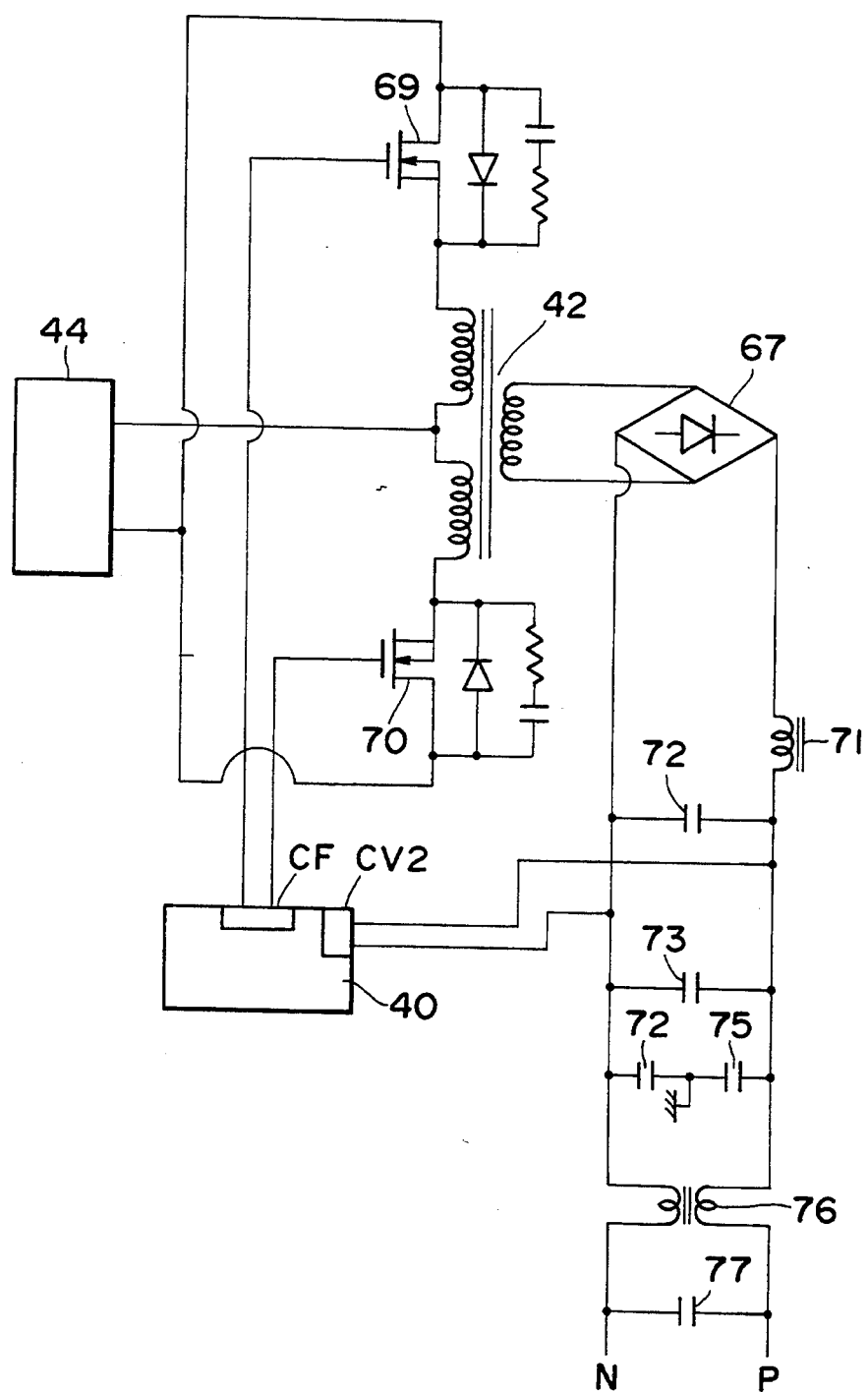
FIG. 6 is an electric circuit diagram of a boosting transformer shown in FIG. 4.

In FIG. 6 showing a specific electric circuit diagram has the booster transformer 42, the switching element 41, a diode bridge 67, and a filter circuit 68 as shown in FIG. 4. Switching elements 69, 70 are turned on/off, inductive power is generated on the secondary side of the boosting transformer 42. The inductive voltage is subjected to full-wave rectification at the diode bridge 67 before being converted to DC power via the filter circuit 68.

A choke coil 71 and capacitors 72-75, 77 as noise absorbers, and a noise filter 76 are used. CF and CV2 designate connectors.

Figure 7:
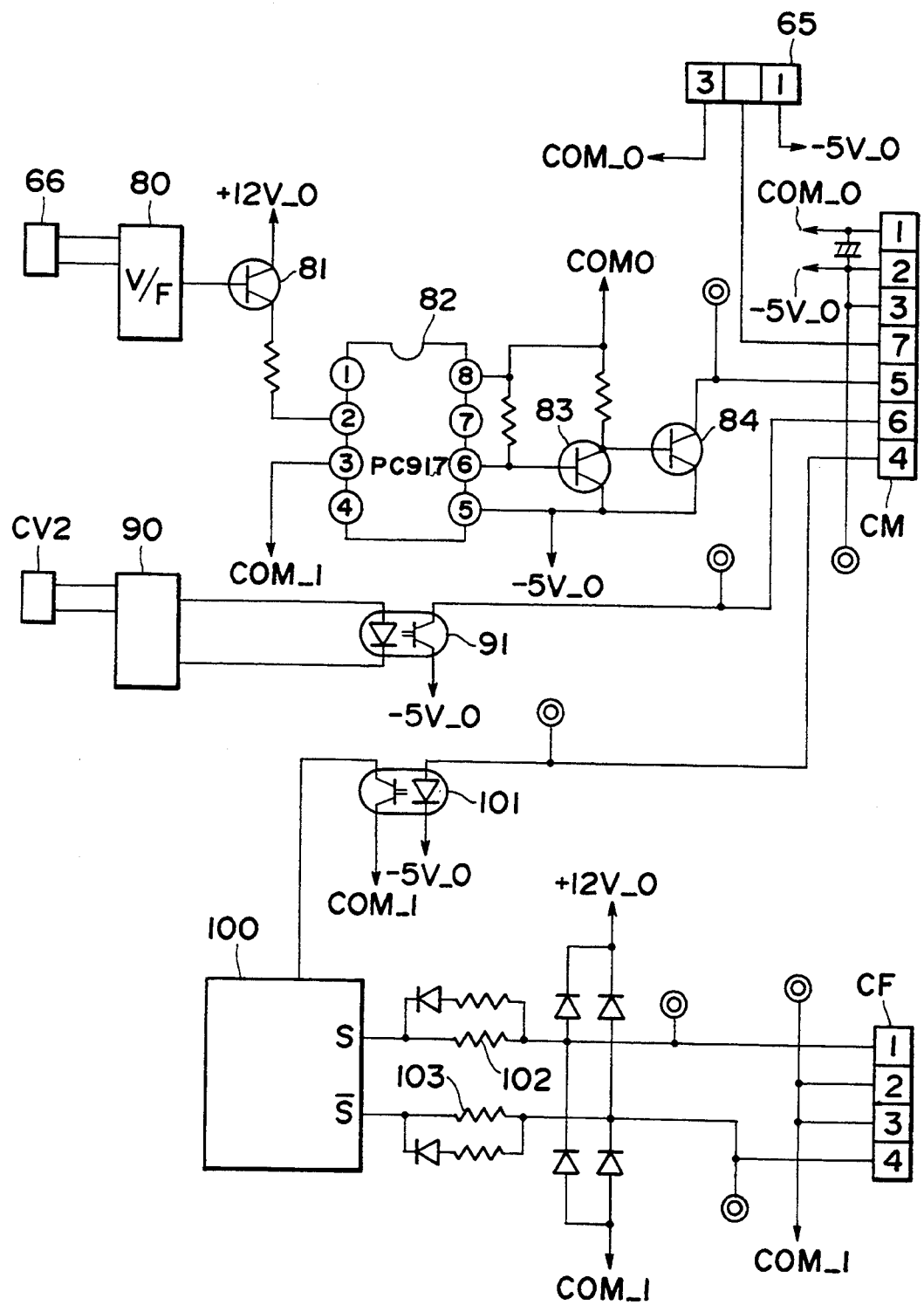
FIG. 7 is an electric circuit diagram of a control circuit shown in FIG. 4.

In FIG. 7 showing a specific electric circuit diagram of the control circuit 40 of FIG. 4, the voltage indicating the value of the current supplied through the connectors 65 is supplied via connectors CM to the microcomputer for controlling the outdoor unit.

A V/F (Voltage/Frequency) converter circuit 80 is used for converting the voltage output from the connector 66 (shown in FIG. 5) into a pulse train of frequency corresponding to the voltage and supplying the pulse train to a transistor 81, and a photocoupler 82 is capable of operating at high speed. The output of the photocoupler 82 is subjected to waveform shaping and power amplification in transistors 83, 84 before being supplied to the connectors CM. With the photocoupler 82 thus employed, the V/F converter circuit 80 is insulated from the connectors CM.

Figure 8:
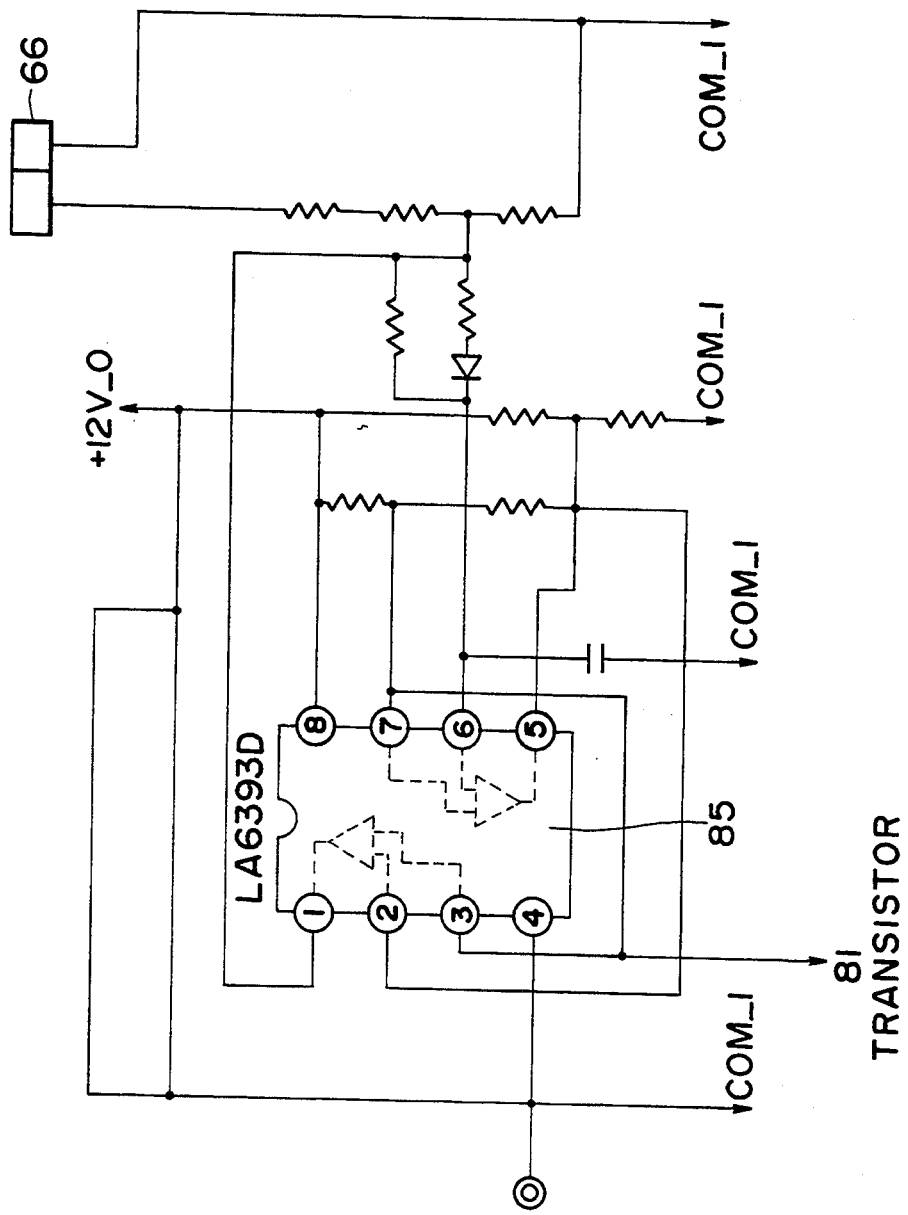
FIG. 8 is an electric circuit diagram illustrating a V/F (Voltage/Frequency) converter circuit.

In FIG. 8 illustrating the V/F converter circuit 80, an integrated circuit 85 accommodates two differential amplifiers and forms an oscillating circuit. The oscillating frequency is determined by the voltage difference between No. 6 and No. 7 terminals.

In FIG. 7, an abnormal voltage detection circuit 90 is used for applying a signal to a photocoupler 91 when the voltage supplied to the connector CV2 exceeds 290 V. The photocoupler 91 applies a signal to the connectors CM according to the signal above.

Figure 9:
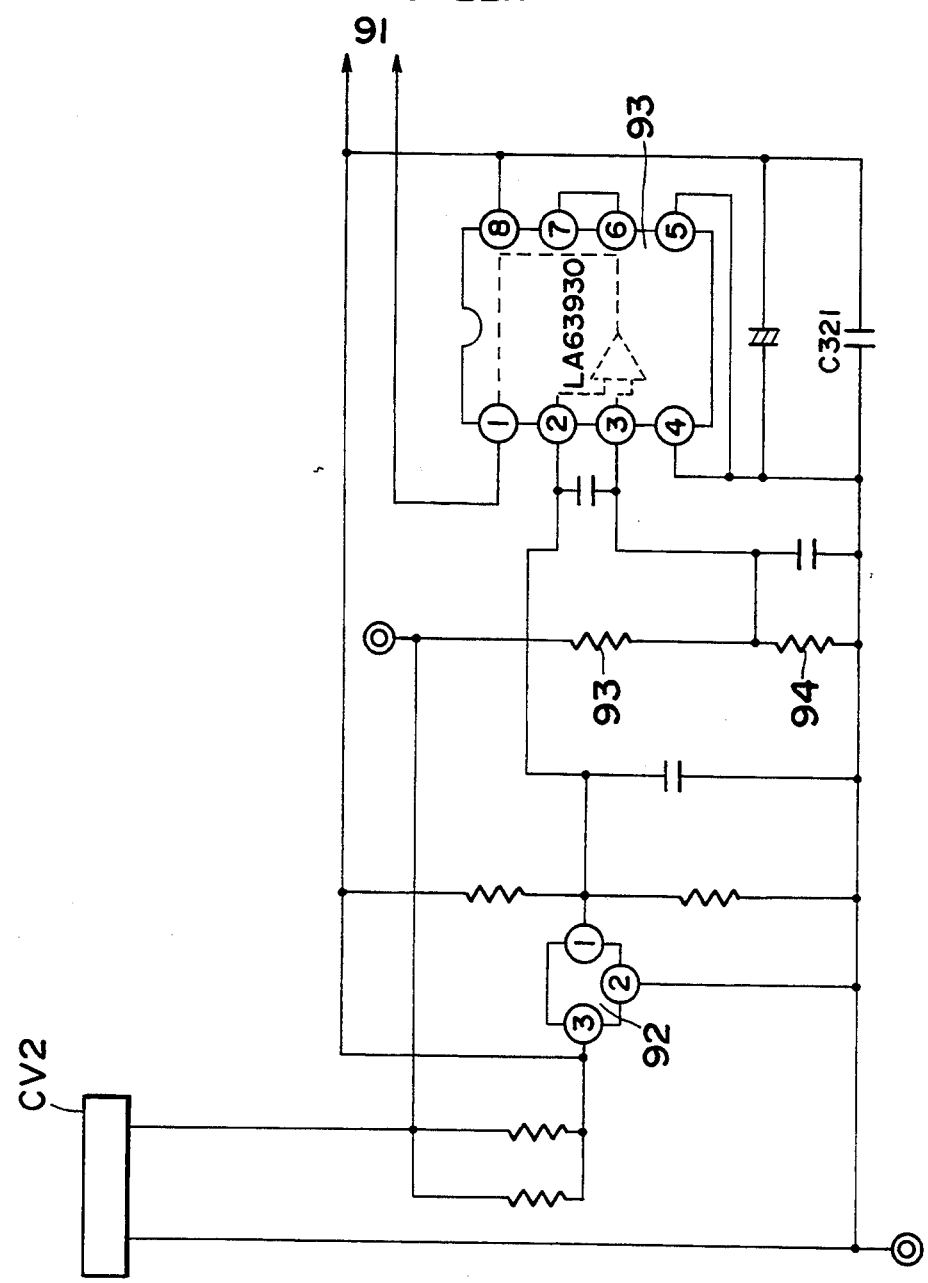
FIG. 9 is an electric circuit diagram illustrating an abnormal voltage detection circuit.

In FIG. 9 showing an abnormal voltage detection circuit, a constant voltage output circuit 92 (TL431ACLP) is used for supplying the basic voltage to No. 2 terminal of an integrated circuit 93 (the same circuit as the integrated circuit 85). The voltage from the connector CV2 is divided by resistors 94, 95 before being supplied to No. 3 terminal.

In FIG. 7, an FET drive circuit 100 is used for generating ON/OFF signals (ON/OFF signals at 32 Kz with variable ON duty) to FETs 69, 70 according to the signal (a pulse wave having a constant frequency with the ON duty changed) supplied via a photocoupler 101.

The output of the drive circuit 100 is output via resistors 102, 103 and supplied from the connector CF to FETs 69, 70. The ON/OFF signals supplied to FETs 69, 70 are those with ON/OFF inverted to each other.

Figure 10:
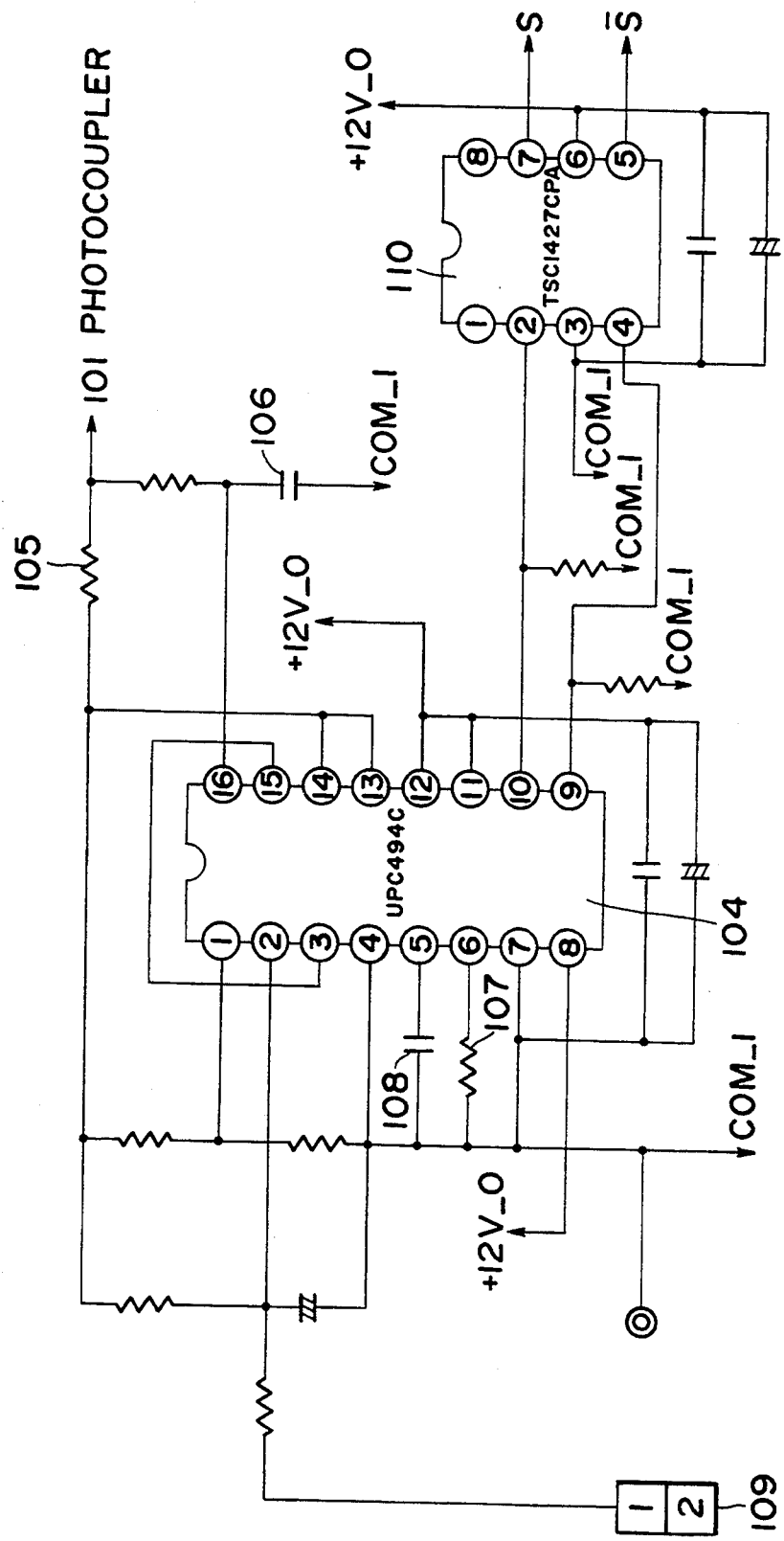
FIG. 10 is an electric circuit diagram illustrating a driving circuit.

In FIG. 10 illustrating the drive circuit 100, an integrated circuit 104 (LPC494C) is provided for outputting ON/OFF signals (32 KHz) for driving FETs 69, 70 which form the switching current from No. 9 and No. 10 terminals. The output of No. 10 terminal is the inverted one of No. 9 terminal.

A constant voltage of +5 V is output from No. 13 terminal and this voltage is switched in the photocoupler 101 via a resistor 105, so that the terminal voltage of a capacitor 106 is smoothed into what corresponds to the signal (a pulse waveform with variable ON duty) from the photocoupler 101. This voltage is supplied to No. 16 terminal and an ON/OFF signal with ON duty adjusted according to that voltage is generated. The oscillating frequency is set by a resistor 107 and a capacitor 108 between No. 5 and No. 6 terminals.

No. 2 terminal is used to control the operation of the integrated circuit and while a voltage exceeding a predetermined level (H level voltage) is applied to No. 2 terminal, the output operation of the signal is performed. Therefore, the output Operation of the signal is stopped when a connector 109 reaches the ground level (about 0 V). While the switch 43 of FIG. 4 remains on the side of releasing the solar cell, the connector 109 is connected to the ground level (0 V) of the filter circuit 44 and the potential comes up to the ground level.

A buffer circuit 110 (TSV1427CPA) is provided for power amplification. The buffer circuit 110 subjects ON/OFF signals output from No. 9 and No. 10 terminals of the integrated circuit 104 to power amplification up to a level at which FETs 69, 70 can be driven.

The control circuit 40 thus arranged transfers voltage representing the output current of the solar cell 8 to a microcomputer 111, supplies a pulse wave having a frequency representing the output voltage of the solar cell 8 via an integrating circuit to the microcomputer 111. The control circuit 40 also supplies to the microcomputer 111 (797JF of Intel Stored with a program) a signal indicating whether or not the secondary voltage, after the output of the boosting transformer (a switching transformer) 42 is rectified, is higher than 290 V, and changes ON duty when FET is turned on/off according to the signal supplied under PWM control from the microcomputer 111 so as to regulate the secondary voltage.

In FIG. 4, a noise filter 112 is provided for the power supply of the control circuit 40. Thermistors 113, 114 detect the temperature of the outside air and the temperature of the outdoor heat exchanger 11, respectively.

By detecting the temperature of the outside air, the microcomputer 111 controls contacts 115, 116, 117 via a relay in order to control an amount of air to be sent by the outdoor blower 19 by controlling rotational speed (r.p.m.) of the motor. By controlling the contacts 115 to 117, the amount of air is controlled at four stages: very large, large, small and nil (stop).

When the temperature of the outside air becomes lower than 29° C. during the cooling operation, the amount of air is set small, whereas when it is at 31° C. or higher, the amount of air is set large. A temperature differential of 2° C. is set for large/small switching. The compressor 9 is stopped when the frequency of the three-phase AC power supplied thereto is 0 Hz.

Figure 11:
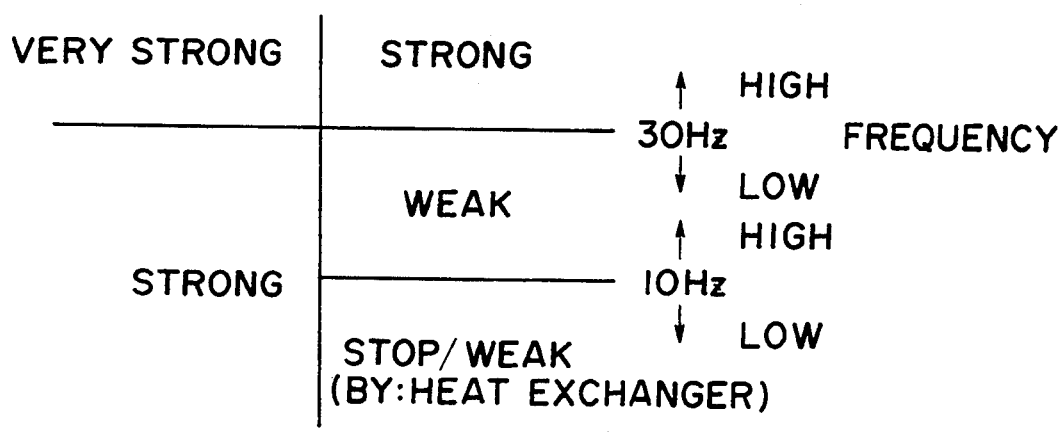
FIG. 11 is a diagram illustrating the relation of the amounts of air sent out from an outdoor blower.

According to the temperature of the outside air and the frequency of the three-phase AC power, control is exercised as shown in FIG. 11 during the heating operation. In the zone based on the heat exchanging temperature, the amount of air is set small when the temperature of the heat exchanger detected by the thermistor 114 is 5° C. or higher and it is set nil (stop) when the temperature thereof is 0° C. or lower. A temperature differential of 5° C. is set for small/nil (stop) switching.

The four-way valve 10 and the solenoid valve 18 are controlled by controlling the ON/OFF of phototriacs 118, 119 according to the signal from the microcomputer 111. In this case, the defrosting operation is performed only when the relationship among the temperature of the outside air, that of the heat exchanger and masking time meets predetermined conditions.

In FIG. 4, a serial circuit 120 as an interface circuit is used for allowing signal transfer between the microcomputer in the room unit and the microcomputer 111.

As shown in FIG. 4, the single-phase 100 V AC power given via the connector 39 is supplied via a noise filter 121 and a reactor 122 to a rectifier circuit 123 for effecting full-wave rectification. Smoothing capacitors 124, 125, together with the rectifier circuit 123, form a voltage doubler rectifier circuit. Consequently, DC power of about 280 V can be obtained.

The DC power that has thus been subjected to voltage doubler rectification is first smoothed by a capacitor 127 via a noise filter 126 and the resultant is supplied to an inverter circuit 128. The inverter circuit 128 comprises six power switching elements (transistors, FETs, IGSTs, etc.) connected in the form of a three-phase bridge and each switching element performs ON/OFF operations according to the ON/OFF signal obtained on the basis of the PWM theory and supplies three-phase AC having a three-phase pseudo sine wave to the compressor 9 (a three-phase induction motor). Therefore, the capacity (r.p.m.) of the compressor 9 can be determined by the frequency of the three-phase pseudo sine wave.

The microcomputer 111 is used to generate a signal for obtaining the three-phase pseudo sine wave having the frequency corresponding to the signal sent from the room unit. The description of the method of generating such a signal will be omitted as it is not particularly restricted, a known method as shown in U.S. Pat. No. 4,698,774 can be used.

Numeral 129 denotes a current fuse, 130 a varistor, and 131 a C.T. (Current transformer) for detecting the current of AC power supplied from the connector 39. The output of this C.T. 131 is converted into DC voltage in a current detection circuit 132 and the DC voltage is received by the microcomputer 111 and used for control purposes.

The microcomputer 111 corrects the frequency of the three-phase seudo sine wave to the negative side so as to prevent the current detected by C.T. 131 from exceeding a set value, 15 A, for example. In other words, the microcomputer 111 lowers the frequency until the current becomes lower than 15 A, whereby the AC power supplied from the connector 39 will never exceed 15 A.

Current fuses are shown at 133, 134 and a power supply circuit 135 generates power for use in driving the microcomputer 111.

A thermistor 136 is disposed for detecting a part of the compressor 9 where its temperature is likely to rise. The microcomputer 111 corrects the frequency of the three-phase pseudo since wave to the negative side to prevent that temperature from exceeding a set temperature, 104° C., for example, whereby the temperature of the compressor 9 is prevented from rising because of an overload.

The DC power supplied from the solar cell 8 is connected between both ends P, N of the capacitors used for voltage doubler rectification 124, 125 so as to have them equally polarized.

The control circuit 40 is then operated to stepdown/boost the DC power output from the solar cell 8 to the voltage level which is obtained by voltage doubler rectification. Although the voltage of the DC power obtained from voltage doubler rectification is theoretically (no-load) 280 V, it is about 250 V in such a state that the load has been connected thereto because of the loss incurred through the noise filters 121, 126, the choke coil (reactor) 122, the rectifier circuit 123 and the capacitors 124, 125. Consequently, it is only necessary that the range of the voltage supplied between the terminals P, N exceeds 250 V. Due to the limit resulting from the withstand voltage of the switching element used in the inverter circuit 128, moreover, the upper limit voltage of the output voltage is set at 290 V in the abnormal voltage detection circuit.

By setting the voltage as described above, the DC output of the solar cell 8 can be supplied to the inverter 128 and when the voltage lowers because the output of the solar cell becomes insufficient, the AC power is supplied from the connector 39, so that the inverter 128 is supplied with the required power at all times.

Moreover, it is generally known that maximum power is made available by operating the solar cell to generate power at the most efficient operating point (current and voltage). In other words, an efficient operating point is such that the maximum power can be obtained without relying on the solar radiation amount.

Figure 12:
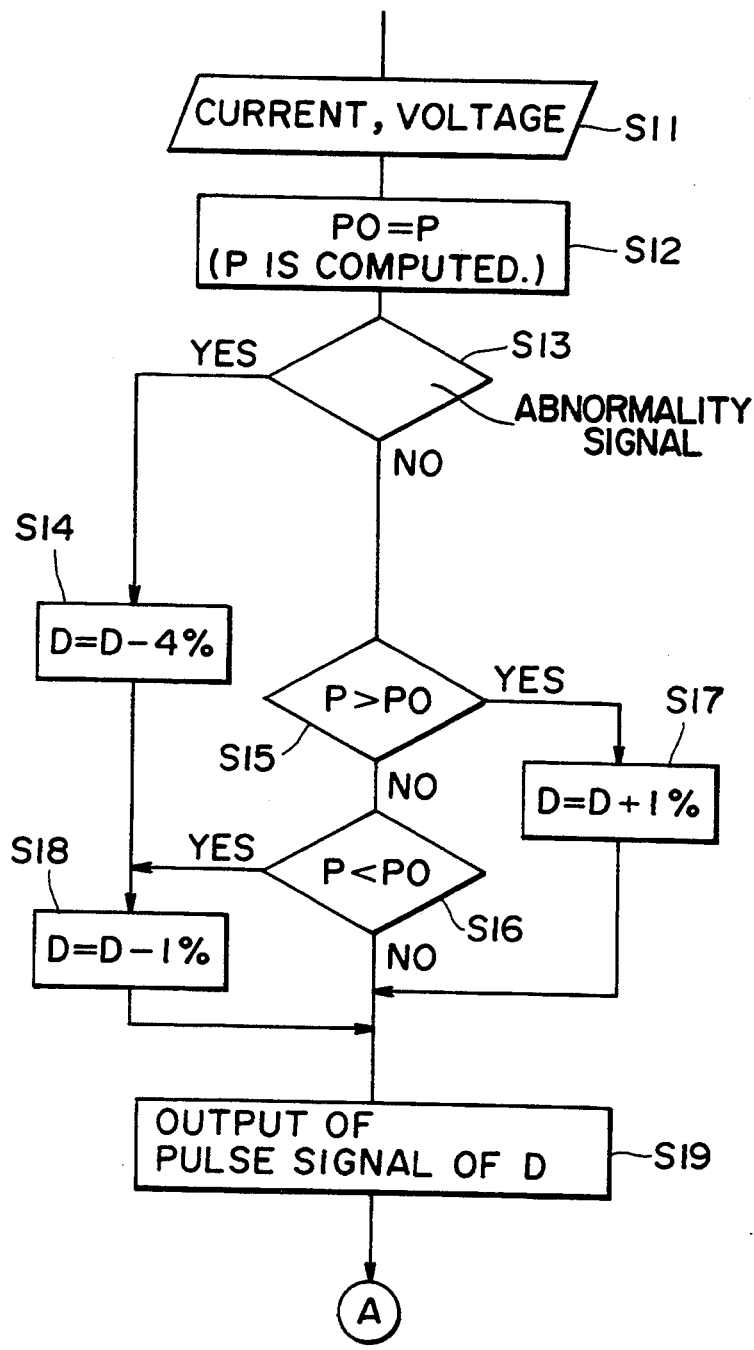
FIG. 12 is a diagram illustrating a process of obtaining maximum power from the solar cell.

In FIG. 12 showing a diagram for obtaining the maximum power generated by the solar cell, the microcomputer 111 is designed to operate according to the program stored in its ROM. The description of the initial process performed by the microcomputer 111 and process thereafter are omitted since these are known in the art and not material to the subject matter of the present invention. The diagram of FIG. 12 is intended to show the operation of changing the ON duty of the pulse waveform output from the microcomputer 111.

As shown in FIG. 12, the current detected by the DC current detector 60 and the value of voltage output from the connector 66, that is, the current and voltage of the solar cell, are fed at Step S11.

DC power P, which is the DC power supplied from the solar cell to the air conditioner, is computed from the above-described current and voltage at Step S12. The value of the DC power (the value of the DC power computed previously) that has already been stored is transferred to PO beforehand. Accordingly, PO represents the value of the DC power previously computed and P the value of DC power computed this time.

Subsequently, the system proceeds to Step S13 at which a decision is made on whether a signal from the abnormal voltage detection circuit 90 exists. In other words, decision is made on whether the voltage applied between the terminals P, N exceeds 290 V. When the requirement at Step S13 is satisfied, the system goes to Step S14 at which the ON duty ratio D is decreased by 4% from the present value in order to newly set it at D=D−4%. See FIG. 13.

At Steps S15, S16, the DC power PO previously computed and the DC power P computed this time are compared. When P<PO (when the requirement at Step S16 is satisfied), Step S18 is selected at which the ON duty ratio D is decreased by 1% to D=D−1%.

The DC power P and the DC power PO are compared as described above and the ON duty ratio D of the pulse signal is increased or decreased, so that such an ON duty ratio D as to maximize the DC power obtained from the product of the current and voltage is automatically set. When the requirement at Step S13 is not satisfied, the current and voltage which maximize the power generated by the solar cell are obtained.

Since the process at Step S18 is executed after Step S14 is processed, the same effect as that by the execution of D=D−5% is obtained when the requirement at Step S13 is satisfied.

Figure 13:
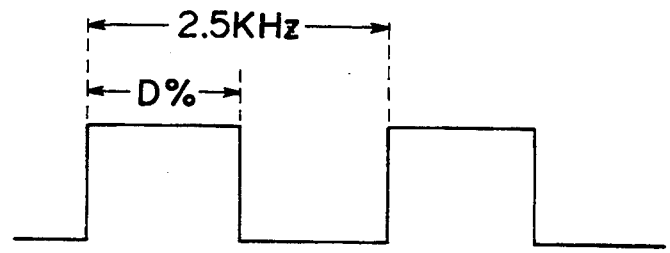
FIG. 13 is a waveform diagram of the signal applied from a microcomputer to the driving circuit.

The pulse signal based on the ON duty ratio D of the altered pulse signal is output from a terminal S at Step S19 (FIG. 13). The pulse signal is generated by setting the time with respect to the ON duty ratio D and OFF time at a timer, and switching the output of the terminal S from ON (high voltage level) to OFF (low voltage level) and vice versa according to the count taken by the timer.

Subsequently, the program stored in the microcomputer 111 is further executed. With this arrangement, the ON duty ratio of the pulse signal is changed (controlled) with one cycle of the program, or with the predetermined time interval which may be 0.1 to 1.0 sec, for example, when the one-cycle time is short.

Figure 14:
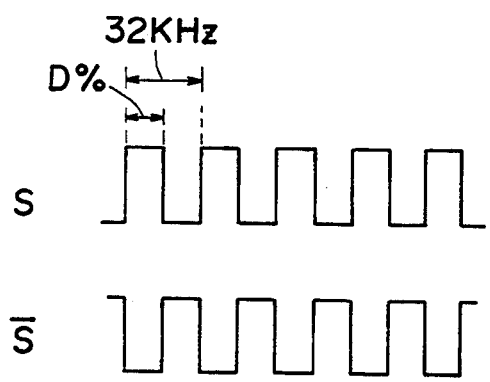
FIG. 14 is a waveform diagram of a signal for controlling ON/OFF of a FET, FIG. 15 a diagram illustrating a process of determining the frequency of a three-phase pseudo sine wave.

The signal (e.g., at approximately 2.5 KHz) shown in FIG. 13 is supplied via the connector CM and the photocoupler 101 to the drive circuit 100. FIG. 14 shows signals S, $\bar{S}$ obtainable with respect to the signal thus supplied and these signals turn FETs 69, 70 on/off.

The ON duty ratio D of the signal is varied within the range of 0% to 99% and D is so regulated that it will be confined within the limits of 0% and 99%. When the voltage given via the connector 66 is lower than 85 V or higher than 150 V, the ON duty ratio D is so regulated that D=0 and the solar cell is protected by stopping the oscillation of the drive circuit 100. In this case, the solar cell can readily be protected by inserting a step at which the situation above is determined between Steps S12 and S13 in the diagram of FIG. 12. Moreover, the ON duty ratio D may be so regulated that the output current from the solar cell is prevented from exceeding the predetermined value (e.g., 6.0 A).

Figure 15:
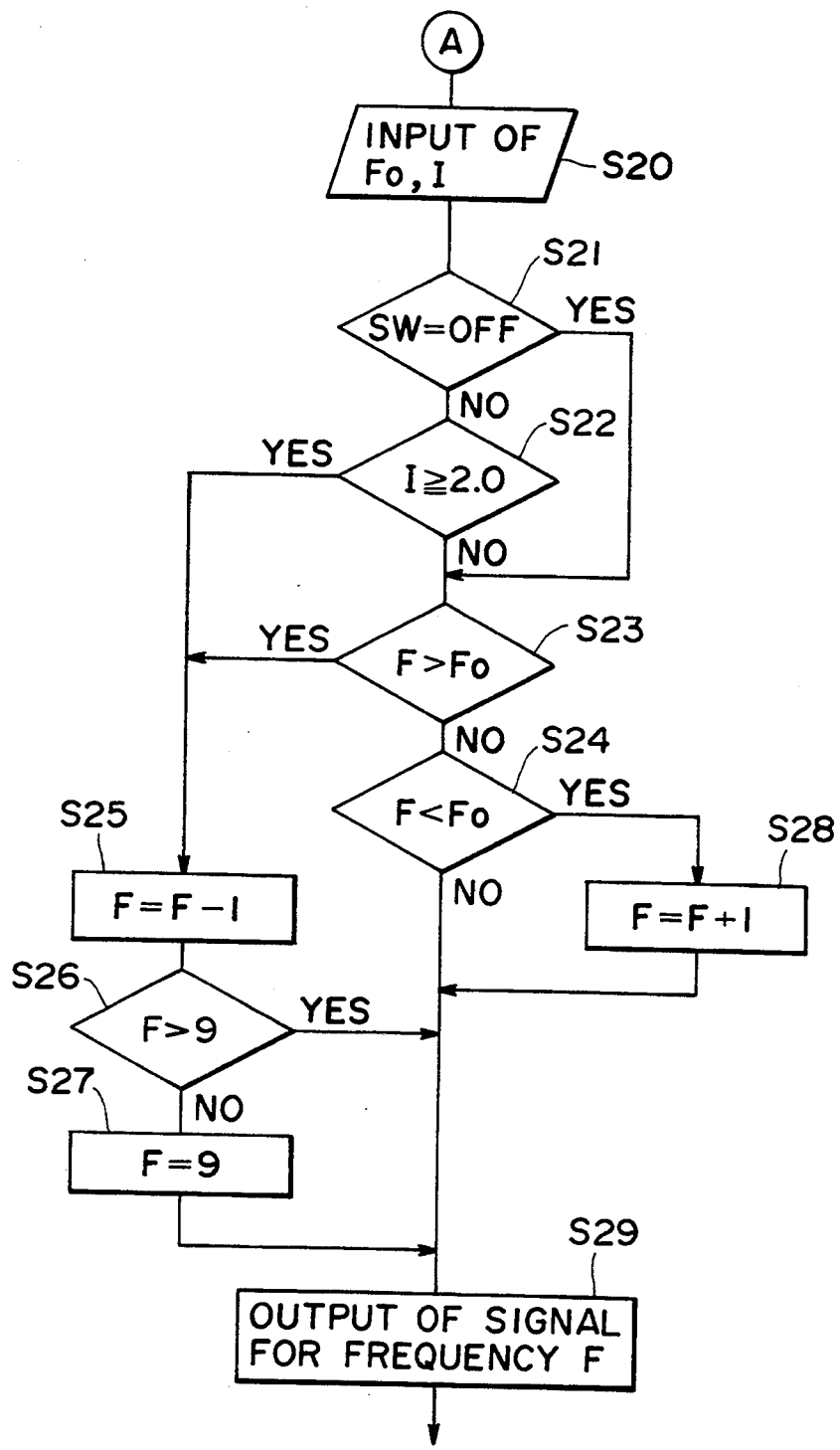

FIG. 15 illustrates a process diagram continuing from A of the diagram of FIG. 12, the former being for determining the frequency F of the three-phase pseudo sine wave supplied to the compressor 9 (FIG. 2)

Fo denotes the value of the target (objective) frequency transmitted from the room unit, F the frequency of the pseudo sine wave presently supplied to the compressor, and I the current detected by C. T. 131.

In FIG. 15, the target frequency Fo and the current I are fed at Step S20. Subsequently, ON/OFF of the switch or the presence or absence of the signal is determined at Step S21. This switch may be fitted in either the room unit or outdoor unit. When the switch is fitted in the room unit or the remote controller, the indoor unit transmits the signal corresponding to the ON/OFF and the microcomputer 111 determines only the presence or absence of the signal.

Then a decision is made on whether the current I is higher than 2.0 A at Step S22. In other words, a decision is made on whether the current flowing into the outdoor unit, which may be arranged to detect only the current (excluding the power supplied from the solar cell) supplied to the compressor 9 when the fitting position of C. T. 131 is varied, is higher than 2.0 A. In this case, a differential of 1.0 A is set for the constant 2.0 A in a case where this decision is reset. When this requirement is satisfied, Step S25 is selected.

Once this decision (Step S22) is made, the constant 2.0 A is changed to 1.0 A and the decision "Yes" is kept at Step S22 until the current I becomes smaller than 1.0 A. The value of 1.0 A represents the current consumed by the outdoor unit, which includes the operating current of the microcomputer 111 and the control circuit 40, necessary for supplying a pseudo sine wave at 9 Hz, which is the lowest frequency for operating the compressor 9, to the compressor 9.

With this decision at Step S22, the current supplied from the room unit (connector 39) to the outdoor unit is held down to 2.0 A or less, so that the DC power generated by the solar cell 8 is 100% utilized at all times, that is, the DC power is mainly used to operate the compressor 9.

The capacity of the compressor 9 is set at such a level as to satisfy the target frequency Fo as required by the room unit within the limit of the sum of the power from the solar cell 8 and 2.0 A of current.

The present levels of the frequency F and the target frequency Fo are compared at Steps S23, S24 and the frequency F is decreased at Step S25 or increased at Step S28.

The lower limit value (F=9) of the frequency F is set at Steps S26, 27. Consequently, the compressor 9 is operated at 9 Hz when F=9, irrespective of the decision made at Step S22.

Figure 16:
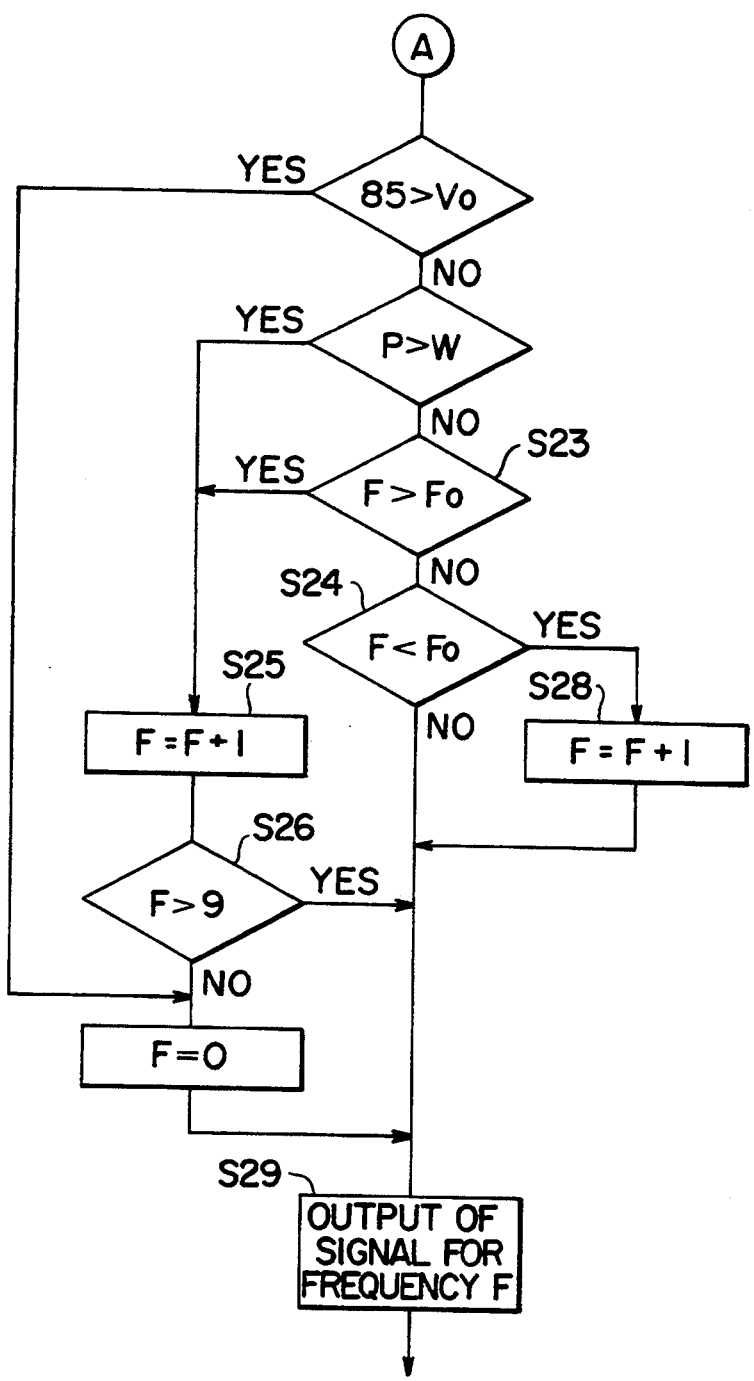
FIG. 16 is a diagram illustrating a process of driving a compressor by the output of the solar cell.

The three-phase pseudo sine wave of the frequency F, which is the frequency set at the preceding steps, is generated at Step S29. Although the lower limit frequency for the compressor 9 has been set at 9 Hz in this diagram of FIG. 15, it may be set at 0 Hz. In other words, only the output from the solar cell 8 may be used to drive the compressor 9. In this case, the power for use in driving the microcomputer 111, the control circuit 40 and the like is directly supplied (not detected by C. T. 151) from the connector 39 and the power P (see the diagram of FIG. 12) generated by the solar cell 8 is arranged so that the value F is corrected in such a way as not to exceed the power W (I x voltage V) which is consumed by the compressor 9, wherein the voltage V may be obtained by the microcomputer 111 as the voltage has been preset to make V/F constant with respect to the frequency. (See FIG. 16). Like step numbers represent like operations of FIG. 15. In this case Vo represents the voltage of the power generated by the solar cell 8.

Figure 17:
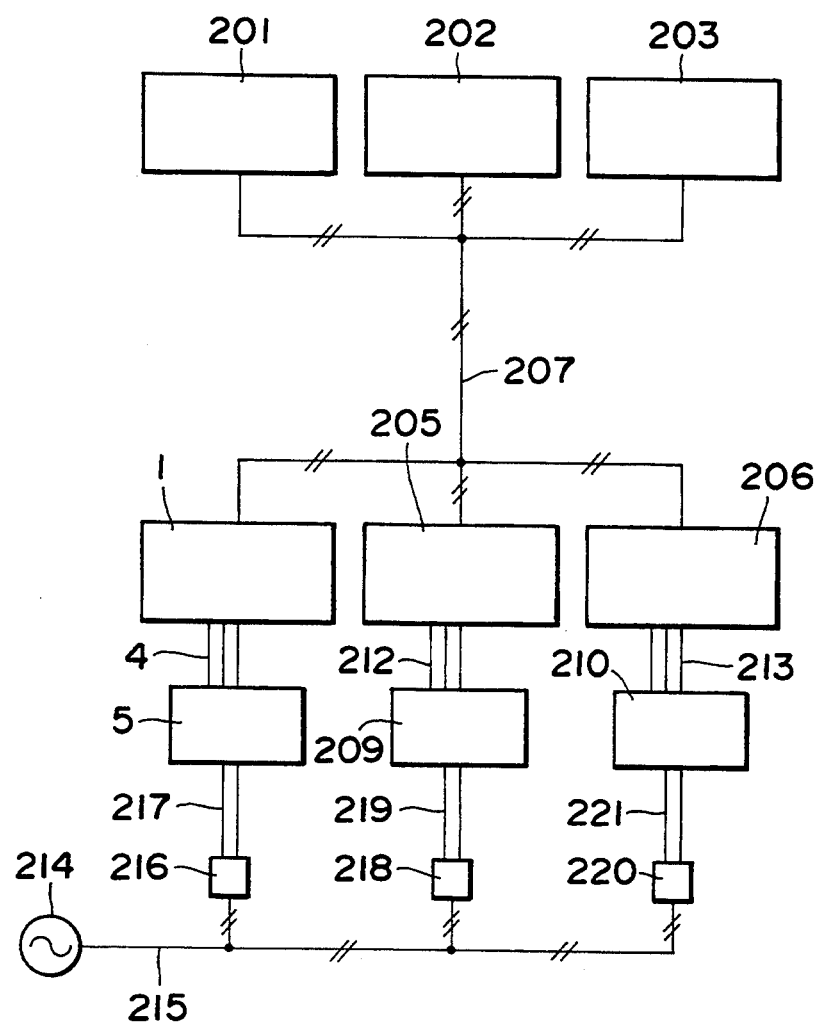
FIG. 17 is a diagram of a system having three air conditioners and three solar cells according to the present invention.

In FIG. 17 which illustrates a system in which three air conditioners and three solar cell panels 201 to 203 are installed, the number of air conditioners and that of solar cell panels being not limited to three, respectively, each of the solar cell panels, 201-203 has a maximum DC power output of 500 W. Outdoor units 1, 205, 206 of the air conditioners are connected via a DC power supply bus 207 (two lines) to the solar cell panels 201 to 203. Room units 5, 209 and 210 are connected to respective outdoor units 1, 205 and 206. With the outdoor units 1, 205, 206 as heat sources and with the room units 5, 209, 210 as utilizers, air conditioning operations are performed in respective rooms where the room units 5, 209 and 210 are installed.

The outdoor units 1, 105, 106 and the room units 5, 209, 210 are connected by means of respective connecting lines 4, 212, 213 (each having three lines: DC power supply line; signal line; and common line). Single-phase AC power and a control signal are supplied from the room units 5, 209 210 to the outdoor units 1, 205, 206, whereas the control signal is supplied from the outdoor units 1, 205, 206 to the room units 5, 209, 210.

A single-phase AC power supply 214 (commerical AC power supply) is provided for supplying power via AC wiring 215 (two wires) to the room units 5, 209, 210. The room unit 5 is supplied with AC power via a current breaker 216 and AC wiring 217 (two wires), the room unit 290 supplied with AC power via a current breaker 218 and AC wiring 219 (two wires), and the room unit 210 supplied with AC power via a current breaker 220 and AC wiring 221 (two wires).

Each of the air conditioners thus constructed performs the air conditioning operation with its air conditioning capacity regulated in conformity with the size and load of the room, the set temperature and the room temperature.

As the room and outdoor units are similar in construction to the aforementioned air conditioner, the description thereof will be omitted.

Figure 18:
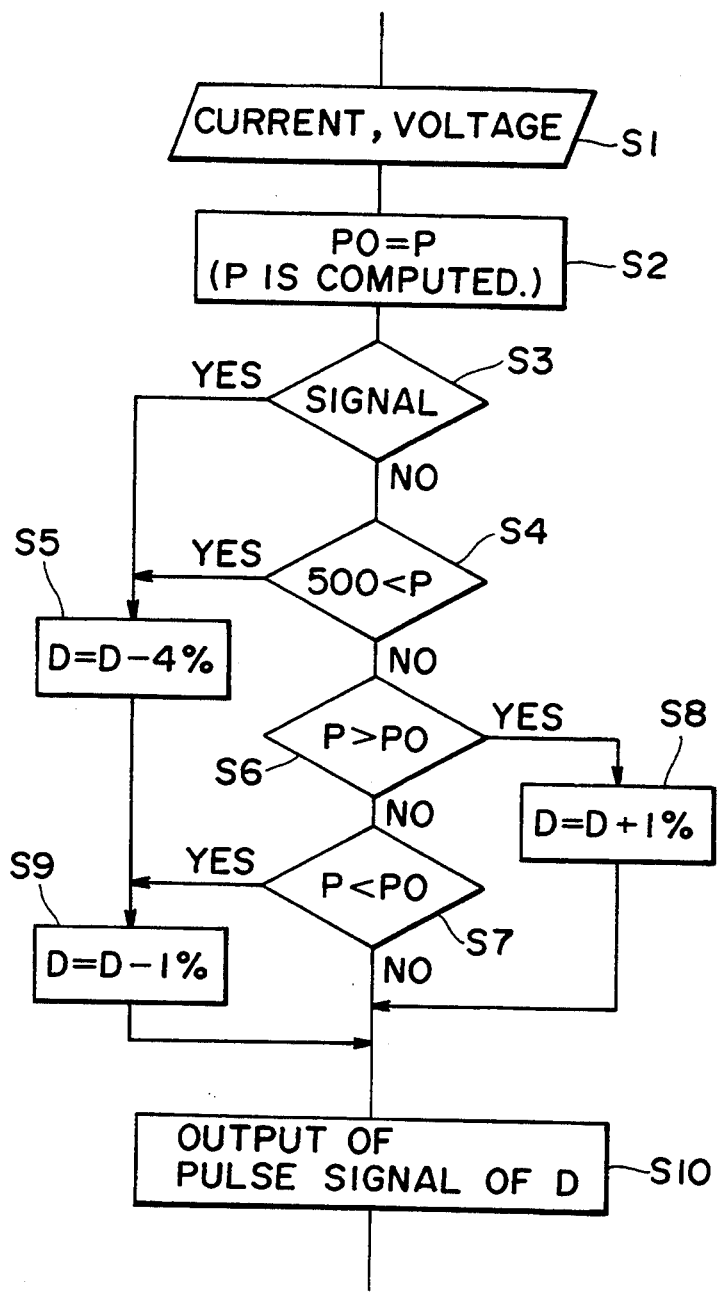
FIG. 18 is a diagram illustrating a process of regulating the input power of the solar cell to a predetermined value.

In FIG. 18 showing a diagram of a case where input power from the solar cells 201 to 203 is controlled to a predetermined value (500 W), the current detected by the current detector 60 and the voltage value output from the connector 66 (the current and voltage of the solar cell) are fed at Step S1.

Then the DC power supplied from the solar cell to the air conditioner is computed from the current and voltage at Step S2. At this time, the value of the DC power P computed previously of the DC power already stored has been transferred to PO. Therefore, PO represents the value of the DC power previously computed, whereas P is the value of DC power computed this time.

Then Step S3 is selected at which a decision is made on whether a signal is transmitted from the abnormal voltage detection circuit 90. In other words, it is decided whether or not the voltage applied between the terminals P and N exceeds 290 V. At Step 4, a decision is made on whether the DC power P is greater than 500 W. When requirements at Steps S3, S4 are satisfied, Step S5 is selected at which the ON duty ratio D of the pulse signal is decreased by 4% from the present value to set it newly at $D=D-4\%$.

The DC power PO previously computed and the DC power P computed this time are compared at Steps S6 and S7. When P>PO (when the requirement at Step S6 is satisfied), Step S8 is selected at which the ON duty ratio D of the pulse signal is increased by 1% to set it at $D=D+1\%$. When P<PO (when the requirement at Step S7 is satisfied), Step S9 is followed at which the ON duty ratio D of the pulse signal is decreased by 1% to set it at $D=D-1\%$.

The DC power P and DC power PO are compared as described and the ON duty ratio D of the pulse signal which maximizes the DC power obtainable from the product of the current and voltage is automatically set by increasing or decreasing the ON duty ratio D of the pulse signal. When the requirements at Steps S3, S4 are not satisfied, there are obtained the current and voltage at which the power generated by the solar cell is maximized.

Since the process at Step S9 is executed after Step S5 is processed, the same effect as that by the execution of $D=D-5\%$ is obtained when the requirement at Step S3 or S4 is satisfied.

The pulse signal based on the ON duty ratio D of the altered pulse signal is output from the terminal S at Step S10. The pulse signal can be generated by setting the time with respect to the ON duty ratio D and OFF time at a timer, and switching the output of the terminal S from ON (High voltage level) to OFF (Low voltage level) and vice versa according to the count taken by the timer.

Subsequently, the program stored in the microcomputer 111 is further executed.

With this arrangement, each air conditioner operates in such a way as to maximize the output of the solar cell such as the solar cell panels 201 to 203 at all times. Therefore, it is possible to regulate the operating point of the solar cell automatically so as to make the maximum output available even if it is rainy or cloudy.

By controlling each air conditioner so that the output from the solar cell consumed thereby remains at 500 W, which is set based on the power consumption of the air conditioner during the normal operation (Step S4), and that the voltage applied to the invertor 128 remains at 290 V or lower (Step S3), the DC power supplied from the solar cell to the invertor circuit is substantially controlled. Consequently, the power capacity of the DC/DC converter having the filter 44, 68, FETs 69, 70, the boosting transformer 42, and the rectifier circuit 67 should be designed only to practically withstand 500 W. As a result, the DC/DC converter can readily be made compact and this facilitates smooth heat radiation. At the same time, the DC/DC converter may be housed in the outdoor unit without rendering it conspicuous in external appearance.

The use of a capacity variable type compressor makes the power consumption of the air conditioner especially greater at the time its operation is started, makes it great when the load is varied in a case that the door or window is opened/shut, and makes it smaller during the normal operation in which the operation is stabilized. The normal operation accounts for about 80% of the whole operation with its power consumption staying at 500 W or less. However, an air conditioner with a maximum power consumption of about 1,500 to 2,000 W, that is, an air conditioner with a greater maximum power consumption, tends to consume larger power even during the normal operation.

When the air conditioner is connected to the solar cell, the maximum amount of power to be generated by the solar cell when the weather is fine is made to conform to power consumption during the normal operation so as to prevent the solar cell from generating excessive power. The solar cell may be utilized efficiently in this way. In this case, the shortage of power from the solar cell is supplemented by power from the AC power supply.

It is therefore preferred to harmonize the maximum amount of power to be generated by the solar cell with the power consumption during the normal operation multiplied by the number of air conditioners when the plurality of air conditioners are connected to the solar cell. In this case, no problem arises when all the air conditioners are being operated. However, a DC power of 1,500 to 2,000 W is to be supplied to the DC/DC converter from the solar cell when only one air conditioner is operated, though the DC power of 1,500 to 2,000 W is smaller than the maximum amount of power to be generated by the solar cell. Consequently, the DC/DC converter may be designed to withstand 1,500 to 2,000 W; nevertheless, it is unnecessary to design the DC/DC converter in such a way according to the present invention as the power consumption during the normal operation is limited to 500 W as the predetermined value.

While only one air conditioner is being operated, the solar cell affords to supply excessive power. Consequently, one air conditioner which has an especially high probability of operation must be selected. When only one air conditioner is allowed to operate while the operation of the other air conditioners is suspended, the aforementioned predetermined value 500 W may be increased up to about 1,000 W. At this time the DC/DC converter mounted in the air conditioner thus selected must be designed to withstand 1,000 W.

Moreover, it may still be acceptable to design the DC/DC converter to withstand the aforementioned predetermined value 500 W provided that a timer is fitted to each air conditioner to restrict or shorten the time, during which the predetermined value above must be increased up to about 1,000 W, to as short as about one hour after starting time.

Further, it is judged from a signal from each air conditioner whether any other air conditioner is in operation. In addition, it may be judged from the relation between the voltage and current of the DC power supplied to the DC/DC converter when the number of air conditioners is small.

Figure 19:
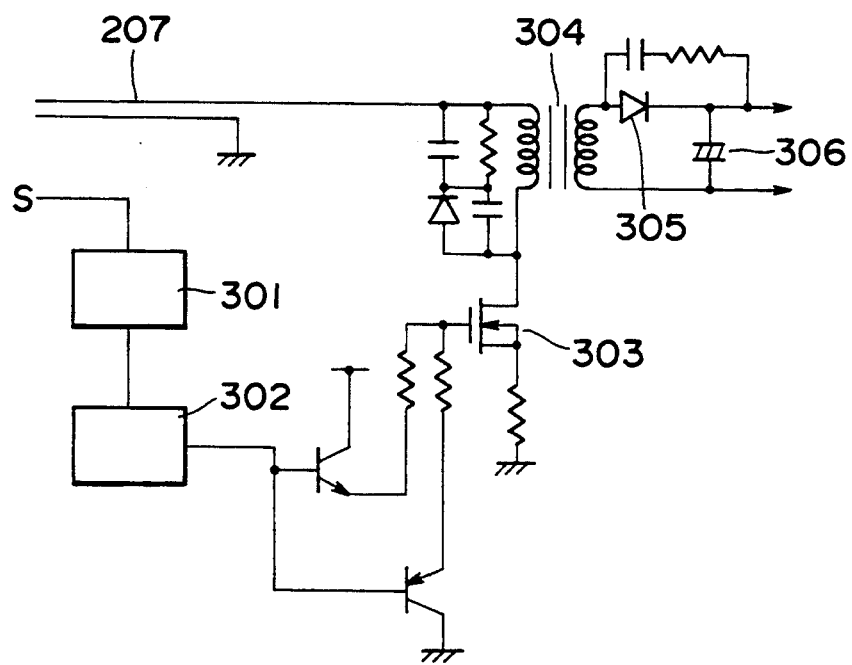
FIG. 19 is an electric circuit diagram of the principal part of a DC/DC converter according to another embodiment of the invention.

FIG. 19 is an electric circuit diagram illustrating another DC/DC converter embodying the present invention. In FIG. 19, numeral 301 denotes an integrating circuit for integrating the pulse signal supplied from the terminal of the microcomputer 111 via the photocoupler and supplying the resultant signal to a PWM oscillating circuit 302 by means of a voltage signal. The PWM oscillating circuit 302 changes the ON duty ratio to 0 to 45% in response to the voltage signal and supplies S pulse signal at 32 KHz to the gate of FET 303. While FET 303 is turned on/off, AC power is generated on the secondary side of a switching transformer 304 and this alternating current is rectified and smoothed by a rectifier diode 305 and a smoothing capacitor 306 to obtain AC power. The voltage of the AC power is boosted so that a voltage of more than 250 V inclusive is available even when the amount of power generated by the solar cell is small.

In the method of controlling air conditioners according to the present invention, a plurality of air conditioners each supplied with AC power from an AC power supply is connected to a solar cell by means of a DC power supply bus of a single system, each air conditioner using the DC power obtained by rectifying the AC power in combination with the DC power supplied from the solar cell via the DC power supply bus as its own operating power. The DC power supplied from the DC power supply bus to the air conditioner is controlled to prevent the DC power supplied from the solar cell from exceeding a predetermined value, so that the withstand power capacity of the air conditioner against the solar cell can be designed at a predetermined value or lower since the AC power from the solar cell is prevented from concentrating on any one of the air conditioners even when the number of air conditioners in operation is small. In other words, it is possible to reduce the size and cost of the air conditioner as measures for current —and heat— resistance can be taken with ease and this contributes to the extended utilization and installation of plurality of air conditioners with a solar cell as a power source.

Since a solar cell is so controlled as to maximize its output, the solar cell can be utilized with efficiency.

What is claimed is:

1. A method of controlling an air conditioning system having a plurality of air conditioners using a DC power obtained by rectifying an AC power combination with the DC power supplied from at least single solar cell device, comprising the steps of:

automatically controlling an air conditioning power of each of said air conditioners in accordance with a room temperature, connecting a plurality of air conditioners each supplied with AC power from the AC power supply to said solar cell by means of a DC power supply bus, and controlling a volume of the DC power supplied from said DC power supply bus to said air conditioner so that a maximum volume of DC power of said DC power is set to be less than a predetermined value, said predetermined value being less than a maximum generating power of said solar cell device, and converting an electric power from said AC power supply into a DC power of the air conditioners when said DC power supplied from said DC power supply bus is less than the DC power for obtaining said air conditioning power, and converting an electric power from said AC power supply into the DC power in the air conditioners when DC power for obtaining said air conditioning power is more than said maximum DC power volume, wherein an electric capacity of an interface between said DC power supply bus and DC power of said air conditioners is set to a value of said maximum DC power.

2. A method of controlling an air conditioning system according to claim 1, wherein said method further comprises the step of varying the voltage of the DC power supplied from the solar cell to at least one air conditioner so as to maximize the value of the DC power represented by multiplication of a DC current by a DC voltage.

3. A method of controlling an air conditioning system according to claim 2, wherein said method further comprises the step of stopping the supply of the DC power from the solar cell to the air conditioner when the voltage of the DC power supplied from the solar cell becomes lower than a predetermined voltage.

4. An air conditioning system having a plurality of air conditioners using a DC power obtained by rectifying AC power from an AC power supply in combination with the DC power supplied from at least a single solar cell device, comprising:

means for automatically controlling an air conditioning power of each of said air conditioners in accordance with a room temperature, a DC power supply bus for connecting a plurality of air conditioners each supplied with AC power from the AC power supply to said solar cell, rectifier device for rectifying the AC power from the AC power supply to thereby provide a DC power, means for controlling a volume of the DC power supplied from said DC power supply bus to said air conditioners so that a maximum DC power volume of said DC power is set to be less than a predetermined value, said predetermined value being less than a maximum generating power of said solar cell device, and means for converting an electric power from said AC power supply into a DC power of the air conditioners when said DC power supplied from said DC power supply bus is less than the DC power for obtaining said air conditioning power, and converting an electric power from said AC power supply into the DC power in the air conditioners when DC power for obtaining said air conditioning power is more than said maximum DC volume.

5. An air conditioning system comprising:

a plurality of air conditioners each supplied with an AC power form an AC power source, a solar cell means for supplying a DC power to a bus, and a supply means for supplying said DC power from said bus to each of said air conditioners, wherein said air conditioners are operated by using the AC power and the DC power, and wherein at least one of said air conditioners has a controlling means for limiting said DC power from said bus to below a predetermined value.

* * * * *